United States Patent [19]

Jhu et al.

[11] 3,924,109

[45] Dec. 2, 1975

[54] AUTOMATIC CIRCUIT CARD TESTING SYSTEM

[75] Inventors: Jai Hun Jhu, Huntington Beach; George H. Wells, Santa Ana; Thomas J. Mulder, Costa Mesa; Don E. McDonald, Huntington Beach, all of Calif.

[73] Assignee: Technology Marketing Incorporated, Santa Ana, Calif.

[22] Filed: July 22, 1974

[21] Appl. No.: 490,672

[52] U.S. Cl. .......... 235/153 AC

[51] Int. Cl.² .......... G05B 23/00; H03K 5/18

[58] Field of Search .......... 235/153 AC; 360/79

[56] References Cited

UNITED STATES PATENTS

| | | | |
|---|---|---|---|
| 2,258,106 | 10/1941 | Bryce | 360/79 X |
| 3,581,074 | 5/1971 | Waltz | 235/153 AC |
| 3,633,016 | 1/1972 | Walker et al. | 235/153 AC |
| 3,651,315 | 3/1972 | Collins | 235/153 AC UX |
| 3,673,397 | 6/1972 | Schaefer | 235/153 AC |
| 3,764,995 | 10/1973 | Helf et al. | 235/153 AC UX |
| 3,812,426 | 5/1974 | Illian | 235/153 AC X |
| 3,813,647 | 5/1974 | Loo | 235/153 AC X |
| 3,832,535 | 8/1974 | DeVito | 235/153 AC |

OTHER PUBLICATIONS

Casler, D. H. et al., Circuit Card Test Technique, In IBM Tech. Disc. Bull., 16(2): pp. 534–535, July 1973.

Shattuck, P. B., Logic Card Test Apparatus, In IBM Tech. Disc. Bull., 13(3): p. 605, Aug. 1970.

*Primary Examiner*—R. Stephen Dildine, Jr.
*Attorney, Agent, or Firm*—Knobbe, Martens, Olson, Hubbard & Bear

[57] ABSTRACT

A system for testing circuits, and particularly adapted for testing printed circuit board assemblies including digital logic circuits, said circuits having multiple pin connectors, including a removable portable data storage element which defines, in machine readable form, a sequence of input signals, and additionally defines selected ones of said multiple pin connectors for application of said input signals, said storage element additionally defining, in machine readable form, the proper sequence of output signals to be produced by said circuit in response to the input signals, and selected ones of said multiple pin connectors on which said output signals should occur, and means for comparing said proper sequence of output signals with the actual output signal sequence from said circuit.

17 Claims, 10 Drawing Figures

FIG. 1.
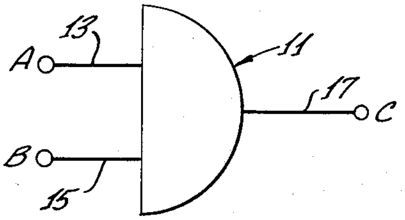
| | A | B | C |
|---|---|---|---|
| 1 | 0 | 0 | 1 |
| 2 | 0 | 1 | 1 |
| 3 | 1 | 0 | 1 |
| 4 | 1 | 1 | 0 |
FIG. 2.
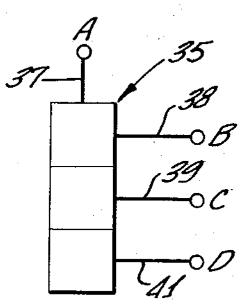
FIG. 3.
| | A | B | C | D |
|---|---|---|---|---|
| 1 | 1 | 0 | 0 | 0 |
| 2 | 1 | 0 | 0 | 1 |
| 3 | 1 | 0 | 1 | 0 |
| 4 | 1 | 0 | 1 | 1 |
| 5 | 1 | 1 | 0 | 0 |
| 6 | 1 | 1 | 0 | 1 |
| 7 | 1 | 1 | 1 | 0 |
| 8 | 1 | 1 | 1 | 1 |
FIG. 4.

AUTOMATIC CIRCUIT CARD TESTING SYSTEM

BACKGROUND OF THE INVENTION

This invention relates to the automatic testing of electronic circuits, and particularly digital logic circuits, which are constructed on boards with multiple pin connectors. More particularly, the invention relates to a system which is adaptable for testing a variety of such circuits through the use of stored data identifying proper testing sequences.

It is common in the electronics arts and particularly the digital electronic circuit arts to construct complex circuits utilizing a plurality of printed circuit boards, each of which is typically connected to the circuit chassis through a multipin edge connector. Each such circuit board commonly includes multiple logic elements, typically of the integrated circuit type. The testing of such circuit boards after assembly has proven to be an extremely inconvenient undertaking, both at the manufacturing and assembly plant and in the field once the equipment is in use and has malfunctioned. These difficulties are primarily a consequence of the fact that circuit boards having logic circuitry of many different configurations are manufactured and it has been virtually impossible to test the individual circuit boards with their complex logic to determine the location of a fault within the circuitry without expending enormous amounts of time in attempting to trace the logic circuitry and test individual circuit elements.

One prior art technique which has been commonly used for testing such circuits is to remove the printed circuit boards one at a time and to replace them with circuit boards which are known to be functioning in a proper manner to determine whether the replacement of this entire unit will rectify the faults which have occurred in the overall operation of the equipment being tested. Such a technique, of course, requires continual maintenance of the "known good" circuit board and, even in the instance where it isolates a circuit board which is malfunctioning, it does not identify the element within the circuit board which has malfunctioned.

SUMMARY OF THE INVENTION

The present invention alleviates these and other difficulties of the prior art by permitting a universally adaptable printed circuit board testing system which will exercise the digital logic within a printed circuit board by selecting specific pins within the multiple pin connector for application of a sequence of input signals. If the various circuit components are operating properly, this input signal sequence will cause the generation of a predetermined sequence of output signals on other specified pins within the multiple pin connector. The testing sequence may be changed to be as simple or complex, or as long or short as is required for the specific circuit board being tested. Furthermore, the various pins within the multiple pin connector may serve as input or output pins, or as both, for different circuit boards, and the present system is totally adaptable to any particular pin arrangement. This flexibility is permitted through the use of a portable data storage medium which, in the preferred embodiment, is a magnetic storage card. This medium stores machine readable data which defines the sequence of signals as well as the pins to which these signals are to be applied, and additionally defines the signals which should appear at defined pins to indicate a proper functioning of the logic circuit.

A magnetic card reader is used to sense the machine readable data and to construct and perform a testing sequence based on the data and to compare the output as well as input signals which are received from defined pin locations within the multiple pin connector with the results which are expected from a properly operating circuit. The system provides an error signal to indicate when a lack of correspondence between these signals occurs, thus identifying a circuit malfunction. The system, by indicating the fault at a predetermined time in the testing sequence, often permits the identification of the particular circuit element which is operating improperly.

Provision is made for the repeating of particular input signals a plurality of times without repeating the machine readable data within the portable data storage medium, in order to pack the data required for circuit testing as densely as possible. The system also permits the circuit board to be tested using only a portion of the test sequence stored on the magnetic card, and permits such testing to proceed as a complete sequence, or to proceed, under operator control, on a step-by-step basis to facilitate identification of malfunctioning circuit elements.

In addition, the system of the present invention has the capability of generating a portable data storage card in response to the sequencing of switches on a front panel of the system by an operator in accordance with a timing diagram or other specification for the circuit being tested.

The system additionally has the capability of producing a testing sequence for storage in machine readable form on a data card in response to input switches which are actuated by an operator to define a sequence of input signals and the response of a "known good" circuit to these input signals. The user therefore need not know the desired operation of each portion of a "known good" circuit in order to pattern a test sequence around such a circuit for storage in the portable storage element.

These and other advantages of the present invention may better be understood by reference to the drawings, in which:

FIGS. 1 and 3 are schematic illustrations of simple digital electronic circuits which may be tested by the present system;

FIGS. 2 and 4 are illustrations of truth tables for the digital logic circuits of FIGS. 1 and 3;

Figure 5:
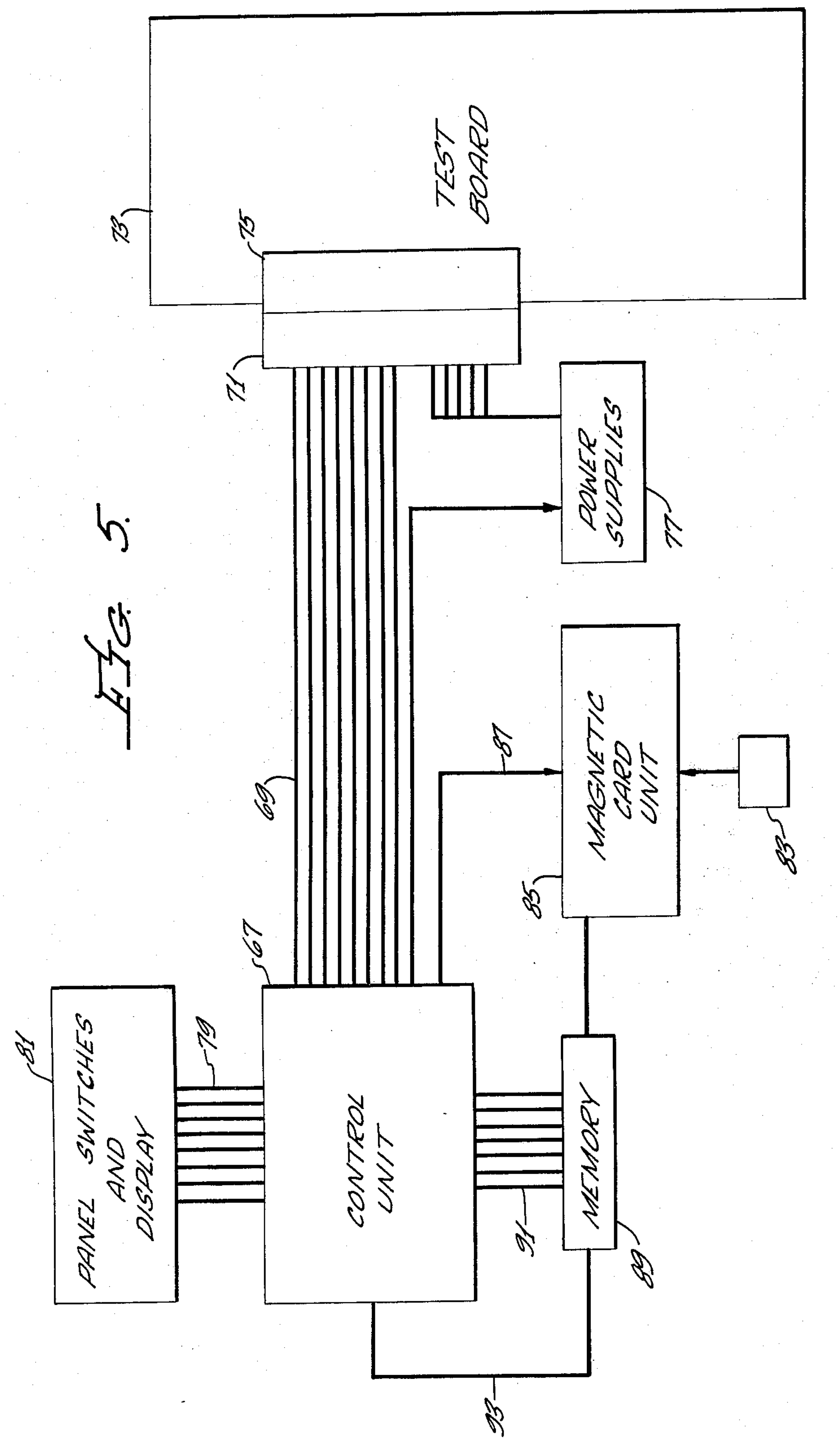
FIG. 5 is a schematic block diagram of the testing system of the present invention.

Referring initially to FIGS. 1 through 4, the well known operation of a pair of typical simple digital electronic components will be briefly described, and these circuits will be used as examples in explaining the operation of the system. It is readily understood by those skilled in the art that printed circuit boards which are produced for digital electronic circuits often contain a great number of circuit components such as gates, counters, multivibrators, delay lines, etc., and that each of these elements is constructed to respond in a predetermined manner to certain input signals.

One such component is the NAND gate 11, shown in FIG. 1. This gate has an A input on line 13 and a B input on line 15 and produces an output C on line 17 which is defined by the state of the A and B inputs. The input levels are typically voltage levels which permit each of the inputs and the outputs to assume one of two voltage states. For example, each of the lines A, B and C may assume a positive voltage state and a zero voltage state, commonly referred to as a true and false or binary one and zero voltage state. In accordance with this latter terminology, FIG. 2 shows what is commonly referred to as a truth table for the NAND gate of FIG. 1. A column 19 of FIG. 2 lists input configuration numbers 1 through 4, while the columns 21, 23 and 25 show the binary state of the output C in response to different combinations of inputs at A and B. Thus, for example, row 27 shows that in the first test configuration, when each of inputs A and B are grounded, output C has a positive voltage level. Similarly each of rows 29, 31 and 33 show a predetermined output voltage level at terminal C for each of the possible input configurations of terminals A and B. In order to completely test the NAND gate 11, it is often necessary to test each of the configurations of rows 27 through 33 by placing the required input signals, either a positive voltage or ground, on lines 13 and 15 and monitoring the output on line 17 to compare this output with the expected output shown in column 25.

FIGS. 3 and 4 show another typical example of a simple digital logic circuit which may be similarly tested. FIG. 3 shows a binary counter 35 having an input A on line 37 and three outputs B, C and D on lines 37, 39 and 41, respectively. In the configuration shown, the D output is the least significant bit of the counter 35 and the B output is the most significant bit. FIG. 4 shows a truth table for the counter 35. This element, unlike the NAND gate of FIG. 1, is not totally defined by the input A, but rather is defined by the input A and the previous outputs on lines 37 through 41, each sequential input on line 37 adding a count to the output of the binary counter. Thus, for each input pulse on line 37, as shown in column 43, the output binary count defined by lines 37 through 41 and shown, respectively, by columns 45, 47 and 49, is incremented by one count. In order to properly test the counter of FIG. 1, the counter must initially be placed at a zero count position as shown in the first row 51 and then successively incremented, typically through the total counter capacity. In the case of the three bit counter FIG. 3, this requires a sequence of seven input pulses. The output after this complete count, as shown in row 53, is then typically tested by monitoring the outputs on lines 37, 39 and 41 and comparing each of these outputs with a binary one state. In a typical test routine, it is assumed that the binary counter is operating normally if the proper output appears at the end of the counting sequence, so that the interim outputs of rows 55 through 65 may be ignored.

It is clear, even from the extremely simple examples of FIGS. 1 through 4, that a variety of different test techniques is required for the testing of various digital logic circuitry, but that in each case a predetermined input sequence will produce a required output sequence at a predetermined time.

It is also evident from FIGS. 1 and 3 that different printed circuit boards may include input and output leads which do not exist in any predetermined order. Thus, for example, if a similar four terminal edge connector were used for the NAND gate of FIG. 11 and counter of 35, pins A and B of the connector on the board including the NAND gate 11 would be input or stimulus pins, whereas pin B carrying the signal of line 37 for the counter 35 is an output or response pin. It is therefore necessary, in order to produce a universally applicable test system, to provide not only for the proper sequence of input stimulus and the monitoring of output signals, but also the provision that various pins of a common printed circuit board connector may operate as input or output connections depending upon the logic circuitry which is contained on the board being tested. It is also noteworthy, as will be explained further below, that in some instances a common pin connection within the connector may be used for both input and output signals.

Referring now to FIG. 5, a block diagram of the testing system of the present invention which permits the flexibility required for the testing of various dissimilar circuits is shown. A control unit 67 which sequences various input and output signals is connected by a multiple lead connector 69 and a multiple pin connector 71 to the printed circuit board under test 73. The board 73 includes a multiple pin connector 75 for mating with the connector 71. It will be understood that the printed circuit board 73 may include a large number of digital logic circuits which may be interconnected to one another and to the connector pins of the connector 75, the connectors 71 and 75 typically including, for example, 80 separate connecting pins which are utilized to carry data impulses. In addition, the connectors 71 and 75 provide power to the test board 73 from a plurality of power supplies 77.

The control unit 67 is connected through a multiple conductor 79 to a panel 81 which includes a plurality of switches for controlling and predetermining the test sequence for the test board 73 and includes display elements for indicating the proper or improper response of the digital logic circuits on the boards 73 to the input signals produced by the control unit 67. The panel switches of the panel 81 are utilized to input a sequence of digital logic control signals which are used for exercising the test board 73. These input control signals, along with the expected output signals from the test board 73 which are similarly placed into the panel switches 81, may be stored on a portable storage medium such as a magnetic card 83 which is printed and read by a magnetic card unit 85 connected by a control line 87 to the control unit 67. The data which is to be inputted or read from the card 83 is stored in a memory, typically a random access memory 89, associated with the control unit 67, and connected to the control unit 67 by a multiple lead conductor 91. A control line 93 permits control of the memory 89 from the control unit 67.

In utilizing the system shown in FIG. 5, an operator will connect a test board 73 with its associated connector 75 to the connector 71 and power the board 73 using the power supplies 77 controlled from the control unit 67. Using the panel switches 81, the operator will input to the memory 89 a sequence of instructions defining the input pins within the connector 75 which are to be energized and the output pins within the connector 75 which should, under normal operation of the board 73, produce a predetermined sequence of output signals. Again using the panel switches 81, the operator will then input to the memory 89 from the control unit 67 a sequence of input and output signals typically the signals required by the truth table of the digital logic elements in the board 73. This sequence will be stored in the memory 89 and may be outputted through the magnetic card unit 85 for storage on a magnetic card 83 which may be conveniently shipped with the test board 73 or stored for later use. In addition, the card 83 permits the testing of test board 73 in an assembly or manufacturing plant and permits the control unit 67 to test a variety of such boards 73 on the same assembly line through a simple replacement of the magnetic card 83.

In testing a board 73, the operator will place the magnetic card 83 in the magnetic card unit 85 to transfer the sequencing data to the memory 89. The memory 89, through the control unit 67, will then exercise the board 73 and the control unit 67 will simultaneously monitor the output on selected pins as defined by data within the memory 89 to display on the panel 81 malfunctions of the test boards 73. The memory 89 therefore serves as a temporary storage medium both during the inputting of data from the panel switches 81 defining a test sequence and during the actual testing of a board 73, while the magnetic card 83 acts as a permanent storage medium which may be conveniently replaced to reprogram the control unit 67 for the testing of other boards. In addition, because of the relatively small size of the flat magnetic card 83, shipment of this card 83 along with test boards 73 for field testing is extremely convenient.

As an alternative mode for utilizing the system shown in FIG. 5, and particularly for inputting a test sequence to the memory 89, an operator may connect a "known good" test board 73 with its associated connector 75 to the connector 71 and power the board 73 using the power supplies 77 controlled from the control unit 67. The operator will then input to the memory 89 a sequence of instructions defining the input pins and the output pins within the connector 75 which are to be energized and monitored as well as a sequence of input signals for application to the selected input pins. The sequence of expected output signals will not, however, be stored in the memory 89. The operator may then exercise the board 73 utilizing the specified sequence of input signals and monitor the specified output pins, inputting to the memory 89 the signals which occur on the specified output pins. The memory 89 will therefore contain data specifying the input and output pins and the input signal sequence, and will, as well, contain data defining the output signal sequence produced by the "known good" board. A board of unknown quality may then be connected to the connector 71 and the output signals produced by this board may be compared with those produced by the "known good" board.

Figure 6:
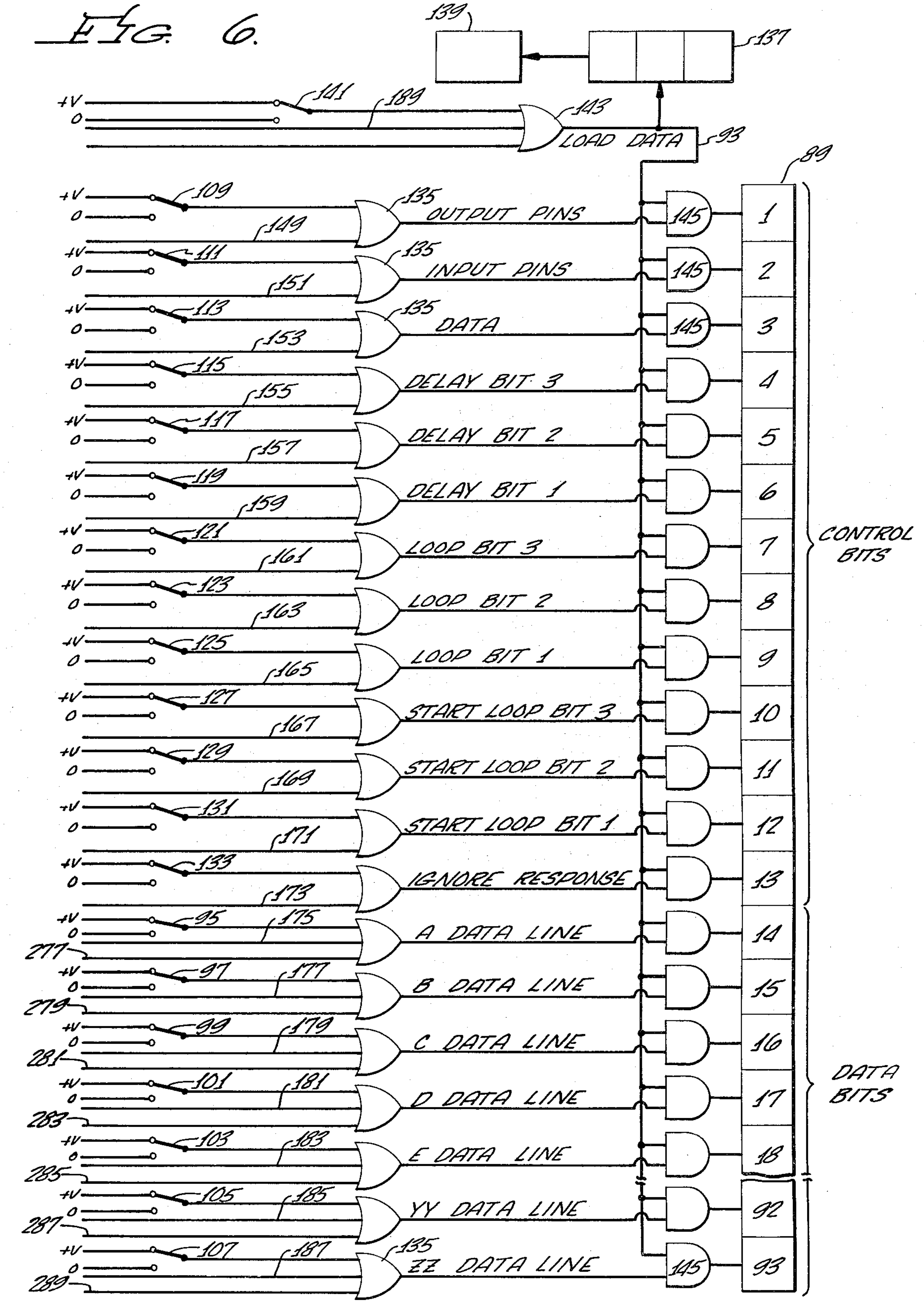
FIG. 6 is a schematic diagram showing the operation of the control unit and panel switches of the system of FIG. 5 for inputting data into the register of FIG. 5.

Referring now to FIG. 6, the use of the panel switches 81 and control unit 67 for storing in the memory 89 a test sequence for use with a test board 73 will be described. FIG. 6 shows the input of a memory 89, which is typically loaded in parallel fashion. Each of the data storage bits 14 through 93 and control bits 1 through 13 of this input line may be addressed to specific locations within the memory 89, under the control of a memory address register, so that repeated inputs may be placed on each of the 93 input lines in parallel and these inputs may then be placed in predetermined locations within the memory 89 on the application of each new data word. In order to minimize the number of switches in the switch panel 81 and the number of required data bits in the storage register 89, the data lines which, in FIG. 6, are shown as coupled to register input locations 14 through 93, in response to the actuation of the switches 95 to 107, are used for a plurality of different purposes, depending upon the position of the remaining switches 109 to 133, which determine the value of the control bits of register positions 1 through 13. It should be understood that, in various control units 67, a different plurality of bits may be used as control bits and data bits depending upon the application and system requirements. A plurality of OR gates 135 permit each of the data and control bits 1 through 93 to be addressed by either the switches 95 through 133, or alternate input lines from a "known good" circuit or the magnetic card unit 85, as will be explained below.

In the exemplary embodiment shown in FIG. 6, a switch 109 is used to place a one or zero in memory location 1, through an OR gate 135 in response to being switched to a +V or OV bus position. Switch 115 and memory location 1 are set to a binary one if the data bits of a given word in memory 89 are used to define the output pin locations. Similarly, a switch 111 is utilized to place a one in the second memory control bit location if the data bits of a memory word are used to define input pin locations. If the data bits of a given memory word define actual data, that is, one of the required combinations within the truth table, the switch 113 is placed in the +V position to place a binary one in the third memory control bit location.

Switches 115, 117 and 119 are typically operated from a binary array of switches on the panel 81 or may be operated from a thumbwheel switch, and determine the delay required between the application of an input pulse and the monitoring of output pulses for the particular digital logic element being tested. Thus, for example, if the switch 119 determines the least significant bit of the binary array and switch 115 defines the most significant bit, the control bits 4, 5 and 6 may be used to define any of seven different delay periods. The circuits described below will then provide for a monitoring of circuit response only after the specified delay, to permit the logic circuit being tested sufficient time to respond to the specified input pulses. If, for example, the basic time element (one binary count of bits 4, 5 and 6) is 1 microsecond, then the time delay following an input pulse in the instance where bits 4 and 5 are zero and bit 6 is a one is 1 microsecond; whereas, if each of bits 4, 5 and 6 have been set at a value of binary one by placing switches 121 through 125 in the +V position, the duration of the required delay is 7 microseconds. Obviously, many additional delay bits may be added to permit increased delay flexibility.

In a similar fashion, bits 7 through 9 make up a binary array which defines the number of times which an input sequence is to be repeated and bits 10 through 12 define the beginning of such a repeated sequence. These bits may also be operated from a thumbwheel switch. A counter 137 is connected to the input line 93 which controls the sequencing of data into the memory 89. The counter 137 is incremented each time a data word is placed in the memory 89. A display 139, which forms a part of the display panel 81 is connected to the counter 137 and visually indicates the test step or input word number being addressed to the memory 89. Thus, for example, if bit 7, which is driven by switch 121, is the most significant bit of the binary repeat sequence, and bit 9 is the least significant bit, it is possible, by manipulating switches 121 through 125, to define any one of seven different repeat cycles of a given input sequence. Likewise, if bit 10, which is driven by switch 127, is the most significant bit of the sequence beginning, and bit 12, driven by switch 131, is the least significant bit, it is possible, by manipulating switches 127 through 131, to define any one of seven different sequence beginnings. If, for example, bits 7 and 8 are set at zero by placing switches 127 and 129 in the binary zero position, bit 9 is set at binary one by placing switch 131 in the +V position, and bits 10 through 12 are set equal to the current valve of the counter 137 as shown on display 139, the current input signal will be repeated but once. If, on the other hand, bits 7, 8 and 9 are each set at a value of one, an input sequence ending at the current test step will be repeated seven times, as may be required, for example, in the testing of the counter shown in FIG. 3 by placing a previous step number in bits 10 through 12, each of the repeated sequences will repeat all steps beginning with the designated test step and ending with the current test step. The use of the repeat bits 7, 8 and 9 and the sequence start bits 10 through 12 eliminates the necessity for multiple input steps for the testing of a device requiring plural successive identical input signals, such as a counter, and thus lends flexibility and efficiency to the testing system.

Control bit 13 is used to indicate a test step during which an erroneous output response of a circuit under test should be ignored; that is, should not produce an error signal. It will be recognized, for example, that during the testing of the counter of FIG. 3 in a situation where the counter is assumed to be performing satisfactorily, if after a given number of counts the final count of the counter is accurate, a series of repeated input signals will be placed on the counter input in response to the control bits 7 through 12. During these inputting operations, the operator will not have specified the proper output signals from the counter under test, and the possibility therefore exists that an error signal will be produced by the circuitry to be described below. A binary one in control bit position 13 in the memory 89 is used in these instances to specify testing steps which are interim steps only and which should not be used for error determination. A switch 133 is used to place a binary one or zero in register location 13 in response to being switched to a +V or OV bus position.

The input control line 93 is connected to a switch 141 through an OR gate 143. Switch 141 is in turn connected to a positive voltage and is utilized to control the operation of the memory 89 from the control unit 67, and to load data from the various switches 95 through 133 into the register 89. The load data line 93 is connected as a first input to a plurality of AND gates 145 which have data and control lines as their second inputs. The AND gates 145 make it possible to arrange each of the various data and control bit input switches to a predetermined sequence, and then to load the memory 89 in parallel from each of the switches 95 through 133 in response to actuation of the switch 141. As is commonly understood, this loading operation will place data in a location within the memory 89 specified by a memory address register.

Referring now to FIG. 7, the memory 89 is again shown, except that the first six words of a control sequence including the various control and data bits 1 through 93 is shown in order to show a typical data storage arrangement for testing the digital logic circuit of FIG. 1. As will be recognized, the data word in row 139 was placed into the memory 89 initially, and was then followed by data word inputs on rows 141 through 149, successively. Each data word input is implemented by the actuation of switch 141 to load particular data, and the position of each data word input is specified by a memory address register 147 which accesses the input data bits 1 through 93 to a selected memory word location.

Referring initially to the row 139, which, in the present example, is test step 1, the initial data input has a binary one in column 1 indicating that the output pins are to be defined in this row. Since rows 139 through 149 are arranged in a fashion which would be used to test the NAND gate of FIG. 1 according to the truth table of FIG. 2, it will be assumed that input lines A and B, or 13 and 15 of FIG. 1, are controlled by data bits 14 and 15, while the output line C, 17 of FIG. 1, is monitored in accordance with data bit 16. The initial column of data 139 therefore defines the sole output pin as that monitored by data bit 16, or data line C. Column 141 has a binary one in the second data bit indicating that the input pins are to be defined, and a pair of binary ones in data bits 14 and 15 defining data lines A and B as the input lines. Column 143 has a one in the third control bit position indicating that a data test step, that is, a step of the truth table FIG. 2, is to be defined. This data has a delay duration of one microsecond, as indicated by 001 in bits 4, 5 and 6, and is not repeated as indicated by 000 in bits 7, 8 and 9, and has a truth table configuration of 001 as shown in data bits 14, 15 and 16, corresponding to the truth table arrangement of column 27 in FIG. 2. Control bit 10 is set at a binary zero, indicating that error response signals should not be ignored.

Similarly, each of columns 145, 147 and 149 indicate input test steps having a one microsecond delay between input and output monitoring which are not repeated, having the following truth table data characteristics: 011, 101 and 110, corresponding to rows 29, 31 and 33 of FIG. 2. Each test in monitored for errors, as defined by control bit 10. This completes the test data required to totally test the NAND gate of FIG. 1.

Figure 7:
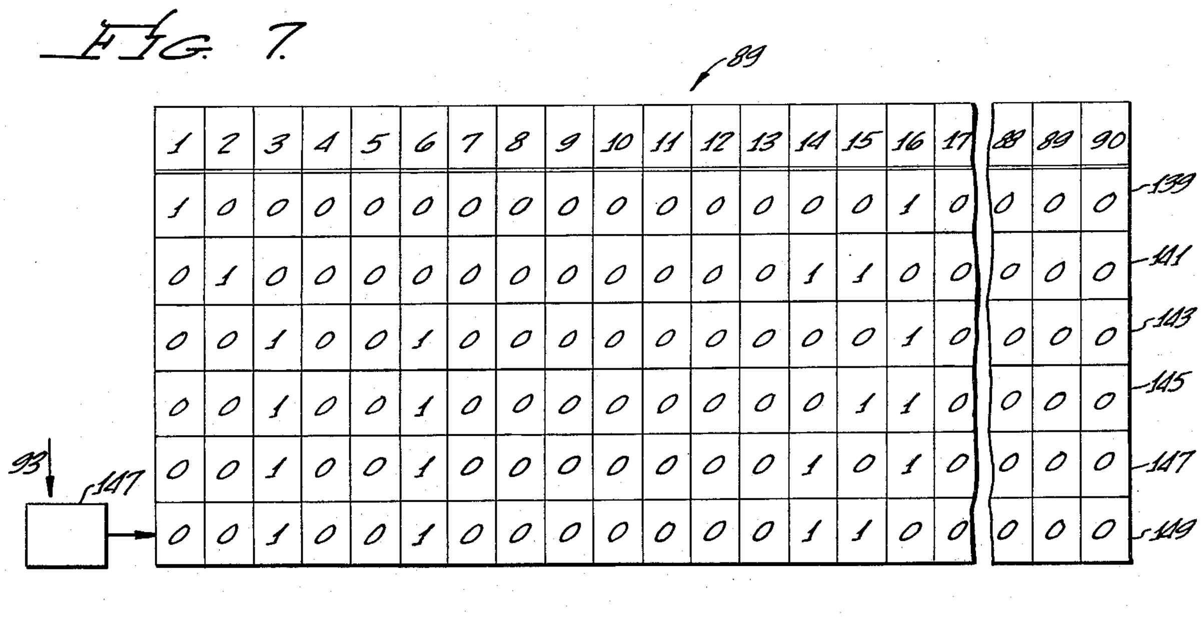
FIG. 7 is a schematic illustration of the data which is stored in a register of FIG. 5 for the testing of the circuit shown in FIG. 1.

Returning to FIG. 6, it will be recognized that in order to arrange the data in memory 89 in accordance with the data shown in FIG. 7, each of the switches 95 through 133 would initially be placed in the zero position. The switch 109 would then be placed in the +V position so that the output pins may be defined, and switch 99 would be placed in the +V position to show that the C data line is the output data line for the NAND gate of FIG. 1. The switch 141 would then be closed to load the shift registers 89 for the first data input word. As shown in FIG. 7, the load data line 93 is connected to the memory address register 147 to increment the register 147 each time the switch 141 is closed, so that a new word location in the memory 89 may be selected for each test step.

Switches 109 and 99 would then be returned to the zero position and switch 111 would be placed in the +V position to indicate that the operator now wishes to define the input pins. Switches 95 and 97 would be placed in the +V position to show that the A and B data lines are the input data lines and the switch 141 would be momentarily closed to load the second data word. Switches 111, 95 and 97 would then be placed in the zero position, and switch 113 would be placed in the +V position to place a binary one in control bit 3 to indicate that test step data is now being entered into the memory 89. In order to define the data, switches 115 and 117 are left in the zero position, while switch 119 is placed in the +V position to indicate a delay before monitoring for the proper output signal of one microsecond. Similarly, switches 121, 123 and 125 are left in the zero position to indicate, by placing zeros in bit locations 7 through 9, that the input is not to be repeated. Switch 133 remains at the OV position to show that output data must be monitored. Looking, then, at the first row of data, row 27 of FIG. 2, the operator would recognize that the inputs which are defined by data bits 14 and 15 should be zero, and switches 95 and 97 would be left in the zero position. This input combination should produce an output of binary one on data bit 16, so the operator will place switch 99 in the +V position to produce the required output indication. In a similar fashion, the switches will be manipulated by the operator for each of the data rows 29, 31 and 33 of FIG. 2 to produce the register inputs shown in rows 145 and 149. Each time that the switches 95 through 133 have been arranged in the desired pattern, the switch 141 is actuated to load a row or word into the memory 89 and update the register 147.

Figure 8:
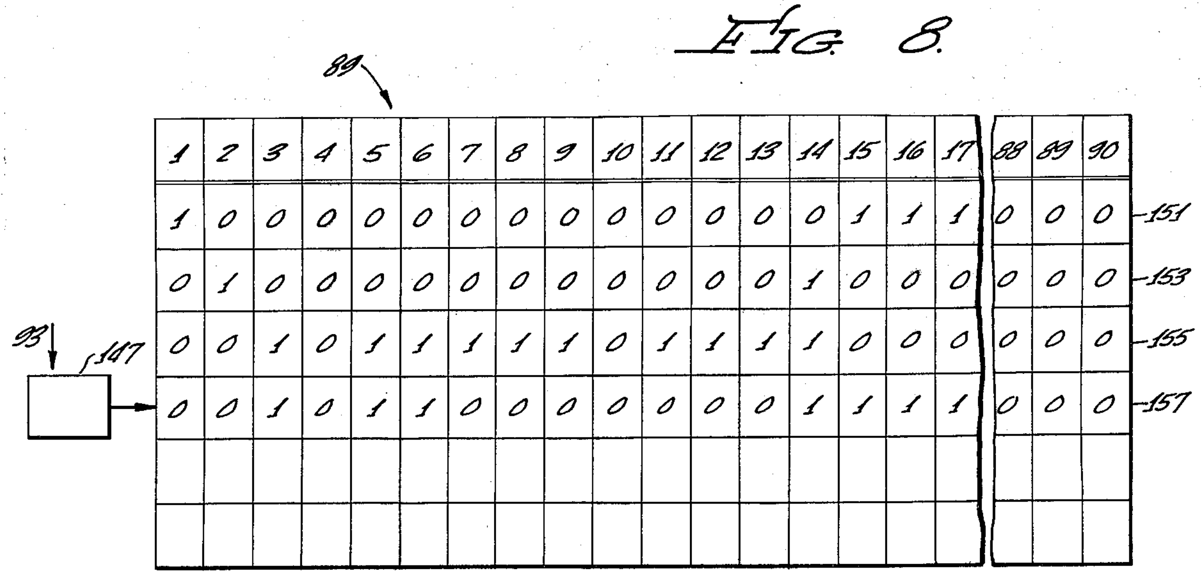
FIG. 8 is a schematic representation of the data stored in the register of FIG. 5 for the testing of the circuit shown in FIG. 3.

Referring now to FIG. 8, a schematic representation of data within the memory 89, similar to that shown in FIG. 7, is shown for testing the counter shown in FIG. 3. Row 151, which, in this example, is the first test step, defines the output pins as pins 15, 16 and 17, that is, data lines B, C and D as shown in FIG. 3. It should be immediately recognized that the flexibility of the present system has been utilized in the testing of the NAND gate of FIG. 1 and the counter of FIG. 3, since line B is defined as an output line in the case of the counter of FIG. 3, whereas line B is defined as an input line in the case of the NAND gate.

Similarly, at row 153, the second test step, an input pin identification word is signaled by a binary one in bit location number 2, and data bit 14, that is, the data on line A, is so specified. As shown in row 155, the third test step, the data itself is now entered by placing a one in control bit 3, indicating that a data entry is to be made. A one in data bit 14 indicates that a signal is to be placed on data line A. This signal, in a typical example, is to be followed by a delay of three microseconds before monitoring any output, as defined by the binary pattern 011 in data bits 4, 5 and 6, and is repeated seven times, as indicated by the data pattern 111 in bits 7, 8 and 9. The repeat sequence is begun at step 3, as designated by 011 in control bits 10 through 12, indicating that only this single test step is to be repeated. At the same time, the ignore output bit 13 has been energized, so that the output data is not monitored for errors at each input step. Rather, the seven input signals indicated in data bits 7, 8 and 9 will bring the counter of FIG. 3 to the position shown at row 65 of FIG. 4, that is, the penultimate step of the counter 35. The next, or fourth test step, shown at row 157 is not repeated, as shown by the data pattern 000 at data bits 7, 8 and 9, and places the counter 35 of FIG. 3 in the final count position of row 53 shown in FIG. 4. At this point, the output data is examined, since the ignore response data bit 13 is a binary zero at row 157, to determine whether the output data pattern 111 of bits 15, 16 and 17, which is expected to appear on data lines B, C and D, is achieved.

It will be recognized, therefore, that through the single third test step of column 155 of FIG. 8, the counter has been stepped through each of its operations except the last operation, and, through a final step in column 157, the final count is achieved and the counter is tested. Since it may be inferred that a counter which achieves its ultimate count after the proper number of input signals is operating satisfactorily, this is sufficient testing for such a device. It will also be recognized that in other embodiments, many more data bits may be used for the loop sequence and the start loop specification in place of data bits 7 through 12, so that multidigit counters and other digital logic members may be tested using the present system. The ignore response bit 13 also assists in this type of testing, since it provides for the sequencing of a logic assembly without testing at each sequential step and therefore permits the operator to avoid the inputting of each of the interim truth table sequences, such as those at rows 55 through 65 of FIG. 4, while still permitting a complete test of the element.

Referring again to FIG. 5, the program which is stored in the memory 89 in accordance with the description of FIG. 6, for example the register values shown in FIGS. 7 and 8, may be conveniently transferred to a magnetic card 83 through the use of a magnetic card unit 85. This flat magnetic card 83 is small and extremely portable, being approximately the size of a standard IBM punched data card, and coated with magnetic material so that a high density concentration of digital data may be stored. The operation of the magnetic card unit 85 and the card 83 is well known in the digital design art, as is the technique for transferring data from the memory 89 to such a card 83. By storing the data on the card 83, the card 83 may be placed, for example, with the test board 73 and later the test board 73 may be again tested by simply placing the card 83 in the card unit 85, transferring the data to the memory 89 and conducting a test in accordance with the following description of FIGS. 9 and 10. During the transfer of data from a card 83 to the memory 89, the various data bits of each data word are addressed, in proper order, through lines 149–187 of FIG. 6 and OR gates 135 to the control and data bits 1 through 93. In addition, a timing signal from the card unit 85, which sequences words into the memory 89, is connected to line 189 of FIG. 6 to increment the memory address register 147, and enable AND gates 145. This system therefore allows accurate but convenient field testing of the test board 73, since the card 83 may be shipped with the test board 73 for testing in the field. In addition, the use of such cards 83 permits the testing on an assembly line of various configurations of test boards 73 by simply selecting the proper magnetic card 83 for programming the control unit 67 to test a particular board 73.

Figure 9:
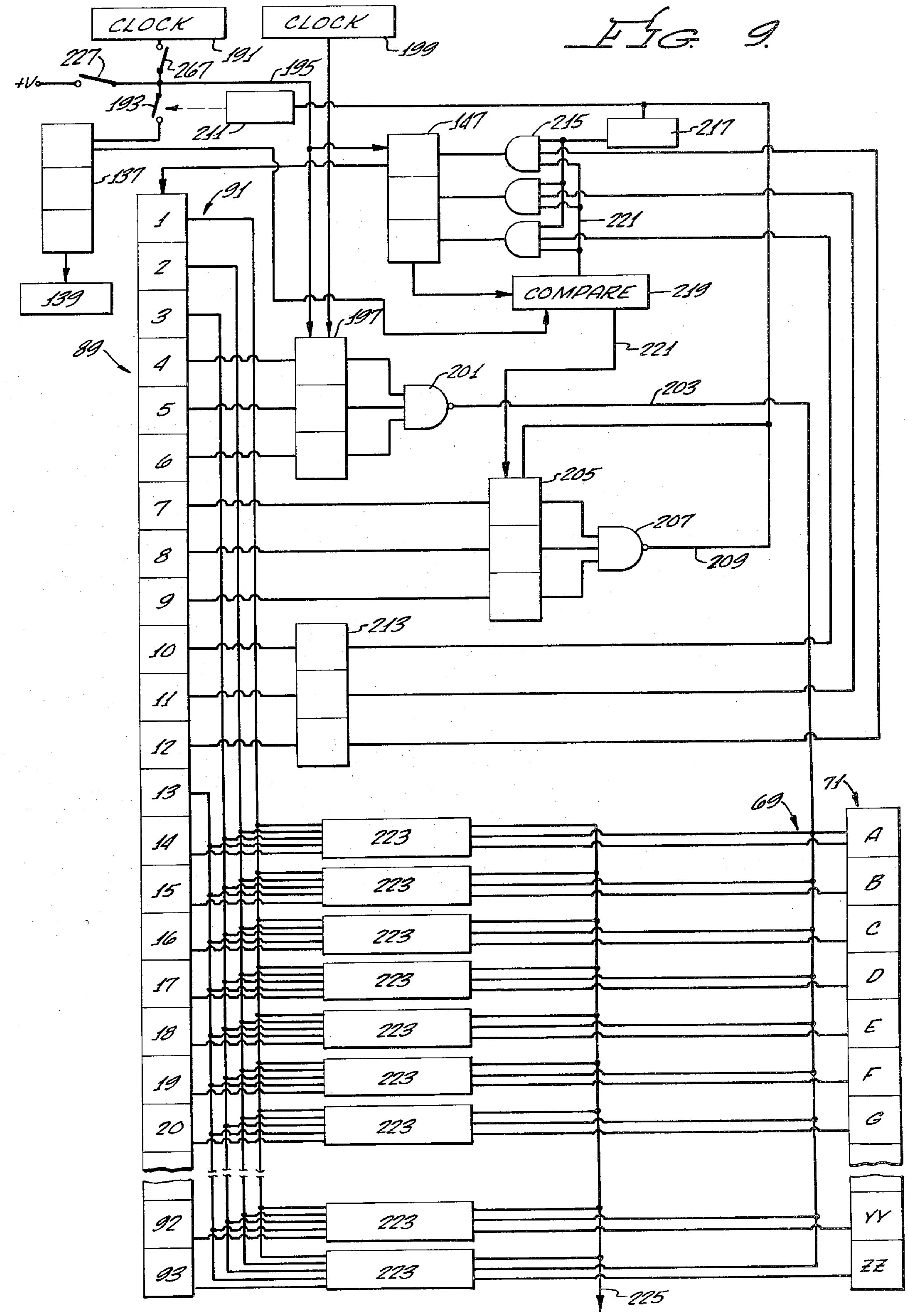
FIG. 9 is a schematic electrical circuit diagram showing the operation of the control unit and panel switches of FIG. 5 during the testing of a printed circuit board.

Referring now to FIG. 9, the circuit arrangement within the control unit 67 of FIG. 5 for use in measuring the response of a printed circuit board 73 containing digital logic will be explained. The control unit 67, as previously described, is connected by a plurality of wires 69 to a connector 71 which is connected to a mating connector on the printed circuit board 73. In addition, the control unit 67 is connected by a plurality of lines 91 to the memory 89. The control unit 67 additionally includes a clock 191 which is used for clocking data from each of the memory elements within the memory 89 by incrementing the memory address register 147. This clock 191 is connected to a normally open switch 193 for driving the test step counter 137, and is additionally connected to increment, through control line 93, the memory address register 147. In addition, the clock 191 is connected through a line 195 to the gating input of a counter 197. This gating input 195 is utilized to input data into the counter 197 from bits 4, 5 and 6, that is, the delay duration bits of the memory 89. A second clock 199 is utilized to count down the counter 197 at a rate equal to the smallest delay bit duration. Thus, in the embodiment shown, the clock 199 will produce a square wave at a one megacycle rate so that the counter 197 will be counted down at a period equal to one microsecond. When a clock signal is present from the clock 191 on line 195, the binary coded delay duration from register bits 4, 5 and 6 is inputted into the counter 197, and this value is immediately counted down by the clock 199. Each of the bits of the counter 197 forms one input to a NAND gate 201, the output of which is a binary zero unless each of the inputs is a binary zero, at which time the output on line 203 is a binary one, or +V. Thus, when a value is placed into the counter 197 from bits 4, 5 and 6, the output on line 203 will be zero until the clock 199 has counted the counter 197 down to zero, at which point the output on line 203 will be +V. Since the value of bits 4, 5 and 6 in memory 89 represent the binary equivalent of the delay between input pulse application and output monitoring in microseconds, the output signal on line 203 is used, as will be described below, to time the comparison of expected output signals with actual signals received from the connector 71. Each time a new clock pulse appears at line 195, the values stored in the bits 4, 5 and 6 of memory 89 are again placed into the counter 197 and the countdown process is repeated.

As described previously, bits 7, 8 and 9 contain a binary representation of the number of times an input signal sequence is to be repeated. Bits 7, 8 and 9 are connected to a second counter 205 and the value in the counter 205 is reduced by a value of one each time a looping sequence is repeated. Thus, for example, if a repeat of seven identical input signals is required, each of bits 7, 8 and 9 will contain a binary one, which values will be placed into the counter 205 by a pulse on line 93, and the counter 205 will be counted down each time a loop sequence is accomplished, as explained below. Each of the bits of the counter 205 is connected to a NAND gate 207 which has a zero output until all of the inputs from the counter 205 are zero, that is, the counter 205 has been reduced to a count of zero, at which time the output on line 209 is a binary one, or +V. This +V signal is coupled back to a gating input of the counter 205 to permit the next input repeat bits to be inputted into the counter 205, and is additionally connected to a switch driver 211 which closes the switch 193. The switch 193 is closed by the switch driver 211 whenever the output on line 209 is at +V or a binary one, which occurs whenever the counter 205 has been counted to zero. The switch 193 therefore permits the clock 191 to clock the test step register 137 to the next sequence of input data. If the input signal is not to repeat, the value binary zero is placed in the register 205, closing the switch 193 and permitting the next clock pulse to sequence the memory 89, so that the next input data may be applied to the control circuit as will be further described below.

The counter 137 is attached to the output of switch 193 to count the sequence of test step operations and to visually display this count on the display 139 of panel 81 (FIG. 5) so that, in the event of an error and the resulting halt in the testing sequence, which will be described below, the number of the sequential step at which an error occurred will be displayed on this counter to facilitate location of the fault in the printed circuit board 73. A counter 213, similar to the counters 197 and 205, is connected to bits 10, 11 and 12 to store the test step which begins each of the repeated loops defined in bits 7, 8 and 9. Each bit of the counter 213 is connected to the memory address register 147 through an AND gate 215, the other inputs of which are connected through an inverter 217 to line 209 and to line 221.

A comparator 219 is connected to receive and compare each bit of the test step register 137 with each bit of the memory address register 147, and to output a signal on line 221 when the binary numbers in these registers are equal. The signal on line 221 is used to count down the counter 205.

When a loop is designated by bits 7, 8 and 9, the initial test step is inputted to register 213, and, since the output of NAND gate 207 is OV, the inverter 217 enables AND gates 215 to place the initial test step in the memory address register 147; so that the specified initial test step of the loop is outputted by the memory 89. The output on line 209 drives the switch driver 211 to open switch 193, so that the final loop test step is maintained in register 137. Successive clock pulses increment the memory address register 147 until the final loop test step is reached, at which time the binary data in register 137 is equal to that in register 147, and the output of the comparator 219 on line 221 decrements the counter 205. If the counter 205 has not been counted to zero, AND gates 215 will again address the initial loop test step to the memory address register 147, since the AND gates 215 are enabled by the output of the comparator 219.

When counter 205 is decremented to zero, the signal on line 209 closes the switch 193 and removes the enabling signal from AND gates 215, so that the next pulse from the clock 191 increments the memory address register 147 to the next test step.

Each of the counter 205 and register 213 may contain additional bits in order to permit additional repeat loops or to specify initial test steps in a sequence having more than seven steps. Thus, if a test procedure includes 1024 steps, 10 control bits must be allocated in place of bits 10, 11 and 12 to identify any one of the 1024 steps as the initial step in a repeated loop. Similarly, bits 7, 8 and 9 may be expanded to permit additional repeats, and bits 4, 5 and 6 may be expanded to increase the delay flexibility. These alterations will, of course, require appropriate increases in the size of counters 197 and 205 and register 213.

An alternative testing mode, a switch 227 may be activated by the operator to increment the memory address register one step at a time, rather than utilizing the signals from clock 191. This procedure may be utilized, for example, in trouble-shooting a circuit board.

Each of the bits of memory 89, beginning with bit 14, that is, the data bits and each of the pins of the connector 71 are associated with one of a plurality of identical switching circuits 223 which operate to apply proper input and output comparison signals to the connector 71 in accordance with the data received from the memory 89. Each of the switching circuits 223 is additionally connected to an output error line 225, the output of the NAND gate 201 on line 203, each of register bits 1, 2 and 3, and, in addition, to register bit 13 which is utilized for indicating that error responses are to be ignored for a particular input. The operation of each of these identical switching networks 223 will be explained in reference to FIG. 10, using as an example the switching circuit 223 which is connected between input data bit 14 and pin A of connector 71.

A flip-flop 229 is responsive to the signals from bits 2 and 14 of the memory 89 and is driven to a state which produces a +V signal on output line 231 whenever these signals occur simultaneously. When, however, a +V signal appears on line 2 designating input pins, but a OV signal remains on the line from register bit 14, indicating that bit 2 is not an input pin, the flip-flop 229 will be reset so that a zero output will appear on line 231. The flip-flop 229 is used to store the input information regarding the designation of input pins and will change state only when a signal is present on line 2; that is, only when input pins are designated.

Similarly, a flip-flop 233 is responsive to input data signals from the memory 89 control bit 1 and data bit 14 to produce an output signal on line 235 which is at +V if pin 14 has been designated as an output pin and at OV if pin 14 has not been designated as an output pin. The flip-flop 233 changes state only when a signal is present from control bit 1, so that the flip-flop 233 stores information defining output pins for a particular test sequence. The output of each of the flip-flop 233 and the flip-flop 229 are connected to an OR gate 237, the output of which is connected to a line 239 which is utilized to enable a comparator circuit 241. The comparator circuit 241 is utilized to compare the desired output signal at a given test step, which is received from data bit 14 of the memory 89, with the actual signal received from pin A of the connector 71. The signal on line 239 operates to enable the comparator 241 so that the comparator 241 will only operate if pin 14 has been designated as either an input pin or an output pin. This enable signal on line 239 therefore prohibits spurious error signals from being generated by the comparator 241 in response to data bits which are not being tested. The comparator circuit 241 is a common digital logic circuit utilized for comparing a pair of input signals to produce an output signal indicating whether these input signals are identical to one another.

The comparator circuit 241 is connected through a line 243 to data bit 14 which serves as one input to the comparator 241. This input to the comparator 241 permits a comparison of the input signal with the signal actually applied to pin A of connector 71 to assure that proper input signals are applied. In addition, the signal from data bit 14 of the memory 89 is connected through a line 245 to an inverter 247 which is in turn connected to an open collector NAND gate 249. The other input of the NAND gate 249 is connected to the output of the flip-flop 229. The output of the NAND gate 249 is connected to one input of the comparator 241 through line 251, and to pin A of connector 71 through line 253. As previously explained, the signal on line 231 is +V if pin 14 has been designated as an input and OV if pin 14 has not been so designated. Thus, when data signals arrive in an inverted form at the NAND gate 249, this gate 249 will produce a +V output signal on line 253 to input a +V signal to pin A of connector 71 whenever the signal from pin 14 on line 245 is +V and pin 14 has been previously designated as an input line. The combination of the inverter 247, flip-flop 229 and NAND gate 249 therefore operate as a pulse generator or signal source for providing input signals to the specified input pins of the connector 71.

The output of the NAND gate 249 is, in addition, connected to the comparator 241 by line 251. Since the comparator is enabled when data bit 14 has been designed as an input signal line, the comparator 241 will compare the signal at pin A of connector 17 with the required signal as provided by line 243 and will produce an error output on line 225 if these signals are not identical. If the output of the NAND gate 249 is at +V, which will occur, for example, when data bit 14 has not been designated as an input pin, the signal on line A will control the input on line 251 to the comparator 241. That is, if line 253 is grounded, indicating a OV output from pin A of connector 71, this OV output will control to ground line 251. If, on the other hand, the output from pin A is at +V, the signal on 251 will be permitted to achieve a +V level, so that the line 251 will follow the signal on line 253 whenever data bit 14 has not been specified as an input line.

If data bit 14 has been specified as an output pin, the OR gate 237 will be enabled and, as previously described, the input on line 251 will track the voltage level on line 253, that is, the voltage at pin A of connector 71, so that the comparator 241 will compare the signal on line 251 with the signal on line 243. However, an additional enable input from line 203 is required in the comparator 241 before this comparison will be accomplished. This input signal on line 203 is produced by the gate 201 of FIG. 9 and has been previously explained as a delay line to delay the operation of the comparator 241 for a predetermined time period to enable the digital logic circuitry being tested to properly respond to input signals prior to comparison, so that spurious output signals may be ignored. In addition, an input line 255 connected to control bit 13 will control the operation of the comparator 241. Control bit 13, as previously explained, is a control indication that error responses from the connector 71 are to be ignored. Thus, if a +V signal appears on line 13, the comparator 241 will be disabled, whereas a OV signal on line 255 will enable the comparator 241. If the comparator 241 after the delay required by the signal on line 203, monitors a discrepancy between the signal on line 251 and line 243, an output error signal will be produced on line 225. This signal is connected to an AND gate 257 which has as its other input a signal from a switch 259 on the panel 81. This switch 259 may be opened by the operator if, for some reason during the testing of a digital logic circuit, he wishes to ignore all error outputs. If, however, the switch 259 is in its normally closed position, an output on line 255 will produce an output on line 261 which is connected to an error light 263 on the panel 81. In addition, the signal on line 261 will be used to drive a switch driver 265 which controls the operation of a switch 267 (FIG. 9) connecting the master clock 191 to the memory 89. The switch driver 265 will therefore operate to stop the testing procedure when an error signal is present on line 261.

A front panel light 267 may be connected to the line 231 to give a visual indication to the operator as to which pins have been designated as input pins. Similarly, a front panel light 269 on the panel 81 may be connected to line 235 to give a visual indication to the operator of which pins have been designated as output pins. An additional front panel light 271 may be connected to line 263 to give a visual indication of the actual signal on pin A of connector 71, while a front panel light 273 may be connected to pin 14 at line 245 to give a visual indication of the expected signal at pin A of connector 71. These lights, therefore, appear as a series of lights on panel 81 for each of the data pins, so that the operator may visually monitor the test in progress to compare expected signals with actual signals and to determine whether proper input and output pin specifications have been made.

It will be recognized that the signal from control bit 13 permits, as previously explained, the successive inputting of data signals, without monitoring the response from the printed circuit being tested, so that a test may be achieved only when a final test step is made. This prohibits premature error signals on the panel displays of the panel 81 and an interruption in the test sequence.

Figure 10:
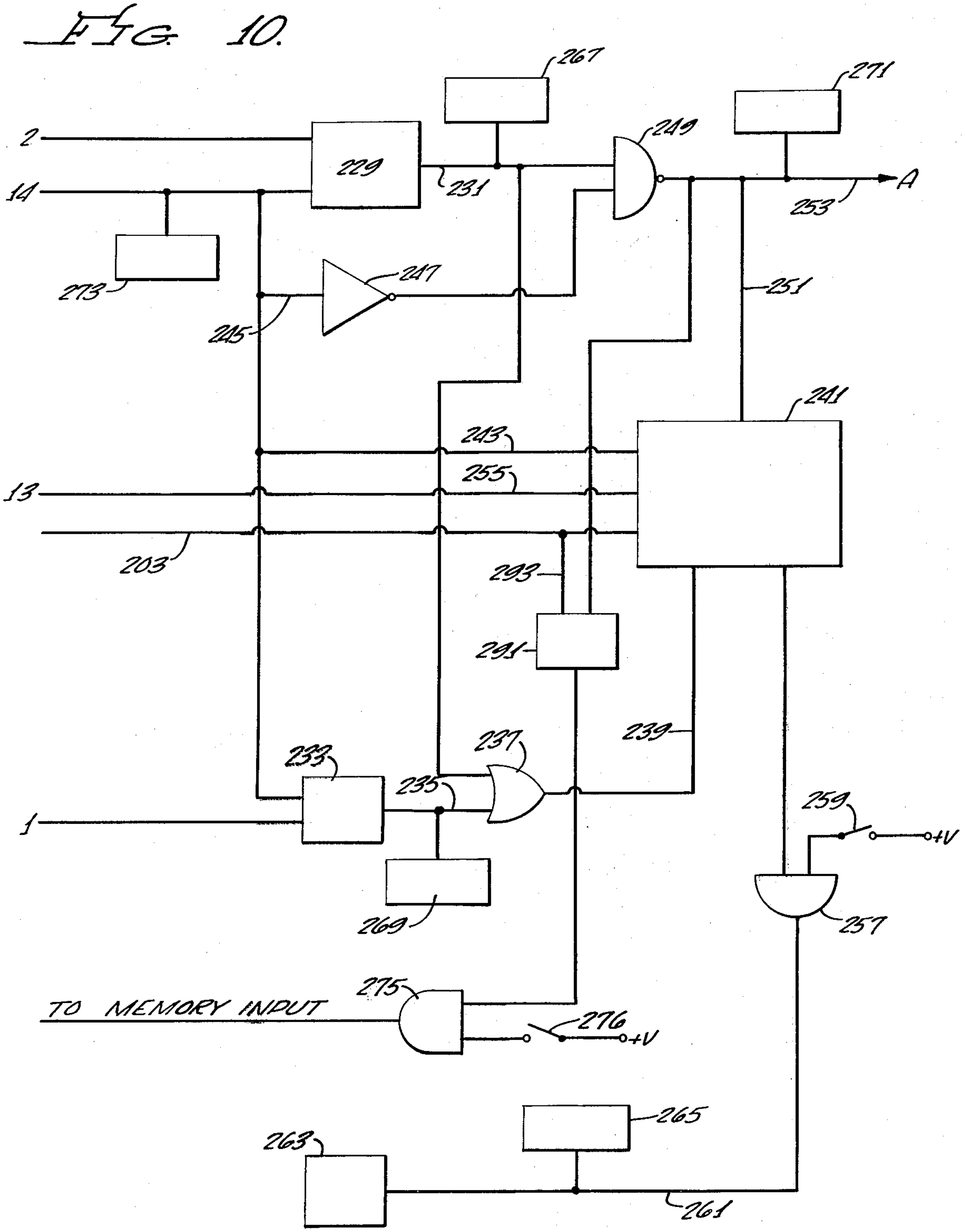
FIG. 10 is a schematic electrical circuit diagram of the switching circuit of FIG. 9.

It will be recognized from the above description of FIGS. 9 and 10 that the control unit 67 of FIG. 5, along with the switches 81 and memory 89, permit an operator to record in the memory 89 a series of input and output designations as well as a series of input data in order to test each of the logic circuits which is present on the printed circuit board 73, and to repeat specified input signals a predetermined number of times in order to properly sequence certain logic elements to be tested. In addition, the time duration of a delay which occurs between the application of input signals and the monitoring of output signals may be independently varied for each of the series of tests to be conducted, so that the timing requirements of the various digital logic elements may be met.

In addition, it will be recognized from the previous description that when data is placed into the memory 89 this memory is clocked through the memory address register 147 by means of a switch 141 on the panel 81. When a test is being conducted, the memory 89 will be cycled by the clock 191.

An alternate method for inputting test sequence data into the memory 89 will now be explained. Under certain situations, the input and output pins of the printed circuit board may be known, and the input driving signals may be specified, but it may create added expense to make a determination on a theoretical basis as to the proper output signals from the logic circuit. Additional elements shown in FIG. 10 enable the system of the present invention to generate a test sequence based partially upon the operation of a "known good" digital logic circuit.

In utilizing this embodiment, the operator would utilize the input control circuits of FIG. 6 to identify the input and output pins of the digital logic circuit through the use of control bits 1 and 2, and would generate a sequence of register data similar to that of FIG. 7, utilizing control bit 3, to record the appropriate input signals according to the truth table or timing diagram of the digital logic circuit being tested. The appropriate output signals are not, however, specified at this time. Thus, referring to FIG. 7, the appropriate register data for the NAND gate of FIG. 1 would be identical to that shown in FIG. 7, except that no data would be specified for the output pin C on data bit 16. Thus, column 16 of FIG. 7 will include a one in row 139 to designate data line C as an output line, but would include zeros in each of rows 143 through 149, since the appropriate output data is assumed to be unknown.

Referring now to FIG. 10, an AND gate 275 is enabled if a switch 276 on the panel 81 is closed when the circuit is to be operated to utilize a "known good" circuit to define output data. This gate 275 is connected to input line 277 of FIG. 6. Similarly, a comparable AND gate 275 in each of the switching circuits 223 is connected to the switch 276 and to each of the lines 279 through 289 of FIG. 6 to permit each of the data bits of the memory 89 to be addressed by the switching circuits 223 of FIG. 10.

The AND gate 275 is connected through an enable circuit 291 to line 253, that is, pin A of connector 71. The enable circuit 291 is additionally connected to line 203 through line 293 in order to delay the application of signals from data from pin A of connector 71 to the memory 89 until the required delay period for response has passed. It can be seen, therefore, that when the switch 276 is in a closed position, the data which appears at pin A of connector 71 will be addressed to the input of the memory 89 in the proper data bit location so that, thereafter, circuits of unknown quality may be compared with the "known good" circuit by opening the switch 276 on the panel 81 and utilizing the data stored in the memory 89.

It will, of course, be apparent to those skilled in the art that the present invention may be implemented using a variety of hardware configurations. In an embodiment which has been constructed, the switches, gates, counters, etc. of the present invention are implemented through the use of a read only memory which drives a decoding circuit, apparatus which is commonly included in devices known as mini computers.

What is claimed is:

1. Apparatus for automatically testing a variety of different digital electronic logic circuits, comprising:

a master clock;

a pulse generator responsive to said master clock for producing synchronized input signals for said logic circuits;

a connector having multiple independent electrical contacts for connecting said apparatus to said circuits;

comparator means responsive to said master clock for comparing output signals from said logic circuits with signals representing proper operation of said logic circuits;

a plurality of switching means connected to said connector contacts, said comparataor means and said pulse generators;

a control unit for sequencing said pulse generators, switching means and comparator means to produce input signals on selected ones of said connector contacts and compare output signals from selected ones of said connector contacts;

a first plurality of manually actuated switches each labeled in correspondence with one of said multiple connector contacts;

a second plurality of manually actuated switches for designating input pins, output pins, and sequences of input data signals for a specific one of said variety of different circuits; and means responsive to said first and second plurality of manually actuated switches for storing data and for inputting data into said control unit, said data defining:

a. a sequence of operation of said switching means;

b. a sequence of operation of said pulse generator; and c. a sequence of operation of said comparator means.

2. Apparatus for automatically testing a variety of different digital electronic logic circuits as defined in claim 1 wherein said second plurality of manually actuated switches additionally includes switches for designating sequences of output data signals, and said means for storing data additionally stores a sequence of expected output signals produced by said electronic logic circuits in response to said synchronized input signals.

3. Apparatus for automatically testing a variety of different digital electronic logic circuits as defined in claim 1 additionally comprising:

means for storing data produced as output signals from said digital electronic logic circuits in response to said synchronized input signals for comparison with the output of other digital electronic circuits.

4. Apparatus for automatically testing a variety of different digital electronic logic circuits as defined in claim 1 wherein said means for storing data comprises a digital.electronic memory circuit, said apparatus additionally comprising:

means for transferring said data from said digital electronic memory circuit to a portable data storage card.

5. Apparatus for automatically testing a variety of different digital electronic logic circuits as defined in claim 1 additionally comprising a third plurality of manually actuated switches for designating a predetermined number of repetitions of sequences of operation of said pulse generator, and wherein said means for storing data is additionally responsive to said third plurality of switches to store data defining a predetermined number of repetitions of selected sequences of operation of said pulse generator.

6. Apparatus for automatically testing a variety of different digital electronic logic circuits, each such circuit including an identical multiple pin connector, comprising:

a multiple pin connector for mating with said circuit multiple pin connector;

a testing circuit comprising:

means producing input signals for application to said logic circuits;

means for measuring output signals from said logic circuits; and switching means connecting said testing circuit to said mating multiple pin connector, said switching means connecting a first plurality of said multiple pins to said input signal producing means and connecting a second plurality of said multiple pins to said output signal measuring means;

a plurality of manually actuated switches corresponding with said multiple pins for producing a sequence of signals specifying a sequence of operations of said switching means;

means for storing said sequence of signals specifying a sequence of operations of said switching means; and means for actuating said switching means in accordance with said stored data.

7. Apparatus for automatically testing a variety of digital electronic circuits as defined in claim 6 wherein said means for storing said sequence of signals stores data defining said first and second plurality of said multiple pins.

8. Apparatus for automatically testing a variety of digital electronic circuits as defined in claim 6 wherein said means for storing said sequence of signals stores said signals on a portable magnetic card to permit said apparatus to respond to different sets of said stored signals.

9. Apparatus for automatically testing a variety of different digital electronic logic circuits as defined in claim 6 wherein said means for measuring output signals measures said signals after a time delay of varying duration, said apparatus additionally comprising:

a plurality of manually actuated switches corresponding with predetermined delay time periods for producing delay signals; and means for storing said delay signals.

10. Apparatus for testing a plurality of different digital logic assemblies each having an identical multiple pin connector, comprising:

means for storing data identifying a first portion of said muitiple pins as input pins, identifying a second portion of said pins as output pins, identifying a sequence of signals to be applied to said input pins, and identifying a sequence of output signals to be received from said output pins, said means comprising:

a first plurality of manually actuated switches each labeled to correspond with one of said multiple pins;

a second plurality of manually actuated switches for designating input pins, output pins, and signal sequences; and a memory element responsive to said first and second plurality of manually actuated switches; input signal producing means;

output signal comparator means; and switching means responsive to said data storing means and connected to said multiple pin connector, said input signal producing means and said output signal comparator means for connecting said input signal producing means to said identified first portion of multiple pins and for connecting said output signal comparator means to said second portion of multiple pins.

11. Apparatus for testing digital logic assemblies as defined in claim 10 additionally comprising:

means for storing data identifying output signals from one of said digital logic assemblies in response to operation of said input signal producing means; and said means for storing data identifying the sequence of output signals being responsive to said stored data identifying output signals from said one of said plurality of logic assemblies.

12. Apparatus for testing a plurality of logic assemblies as defined in claim 10 wherein said memory element is removable from said apparatus to provide a separately portable storage means.

13. Apparatus for testing a plurality of logic assemblies as defined in claim 10 wherein said means for storing data identifying a sequence of output signals stores data defining the duration of a delay which precedes the operation of said output comparator means, and wherein said means for storing data identifying a sequence of input signals to be applied to said input pins stores data defining a predetermined repetition of each of said signals, said data storing means additionally comprising:

a third plurality of manually actuated switches for designating predetermined time delay durations; and a fourth plurality of manually actuated switches for designating predetermined repetitions of selected input signals.

14. Apparatus for testing an electronic circuit, said circuit including a multiple input/output pin connector, comprising:

a data storage medium storing an identification of a first portion of said multiple pins as input pins, a second portion of said multiple pins as output pins, a sequence of input signals to be applied to said input pins, and a sequence of correct outputs expected from said output pins in response to said input signals;

a plurality of manually actuated switches, each corresponding to one of said multiple pins, connected to said data storage medium for inputting said identification and sequence data into said storage medium;

a pulse producing circuit;

a signal producing circuit;

a comparator circuit;

switching means responsive to said data storage medium for connecting said pulse producing circuit to said identified input pins in said identified sequence of input signals;

switching means responsive to said data storage medium for connecting said signal producing circuit to said comparator circuit in said identified sequence of correct outputs; and switching means responsive to said data storage medium for connecting said comparator circuit to said identified output pins.

15. A method of testing different digital logic circuits mounted on printed circuit boards having identical multiple pin connectors, comprising:

manipulating a plurality of switches corresponding to said pin connectors to manually place in a data storage means data identifying said multiple pins for one of said logic circuits as input or output pins;

manipulating a plurality of switches corresponding to said pin connectors to manually place in a data storage means data identifying a sequence of input signals for application to specified ones of said input pins;

placing in a data storage means data identifying an expected sequence of output signals generated by said digital logic circuit on specified ones of said output pins in response to said sequence of input signal; and applying said data stored in each of said data storage means to a signal generating and comparing circuit connected to said multiple pin connector to generate said sequence of input signals and compare said expected sequence of output signals with output signals produced by said digital logic circuit.

16. A method of testing different digital logic circuits as defined in claim 15 wherein said step of placing an expected sequence of output signals in a data storage means comprises the steps of:

applying said data stored in said data storage means identifying multiple pins and a sequence of input signals to a signal generating circuit connected to said multiple pin connector for application of said sequence of input signals to a "known good" digital logic circuit; and placing in a data storage means data identifying the output signals received from said "known good" circuit.

17. A method of testing digital logic circuits as defined in claim 15 additionally comprising:

transferring said data identifying said multiple pins, said sequence of input signals and said sequence of output signals from said data storage means to a portable data storage card; and transferring said data from said portable data storage card to a data storage means prior to applying said stored data to said signal generating and comparing circuit.

* * * * *